United States Patent
Bodenheimer

[15] 3,696,952
[45] Oct. 10, 1972

[54] BULK CARGO HANDLING SYSTEM AND METHOD

[72] Inventor: Bert A. Bodenheimer, Stamford, Conn.

[73] Assignee: Sea-Land Service, Inc., Elizabeth, N.J.

[22] Filed: Oct. 26, 1970

[21] Appl. No.: 83,952

Related U.S. Application Data

[63] Continuation-in-part of Ser. No. 21,966, March 23, 1970, abandoned.

[52] U.S. Cl.................214/314, 206/46 R, 214/152, 214/305, 220/65, 229/14 B, 229/DIG. 3
[51] Int. Cl..............................................B65g 65/34
[58] Field of Search....214/47, 49, 54, 305, 314, 152; 220/1.5, 63, 65; 296/39 R; 105/423; 222/83, 83.5

[56] References Cited

UNITED STATES PATENTS

| | | |
|---|---|---|
| 2,712,797 | 7/1955 | Woehrle.................296/39 R |
| 3,574,332 | 4/1971 | Wetzel.........................214/49 |
| 3,386,605 | 6/1968 | La Font......................220/1.5 |
| 2,989,213 | 6/1961 | Daggitt.........................222/83 |
| 3,171,449 | 3/1965 | Ellms et al. ............214/305 X |

Primary Examiner—Robert G. Sheridan
Attorney—David Rabin

[57] ABSTRACT

A system for transporting bulk cargo within conventional freight containers which includes a disposable container liner adapted to be positioned within a container or truck. The liner includes a flexible bag member having the open end or ends closed by bulkheads. Openings, which are normally sealed during transport of the container, are provided in the rear bulkheads for facilitating loading and unloading of the liner.

12 Claims, 12 Drawing Figures

PATENTED OCT 10 1972
3,696,952
SHEET 1 OF 3
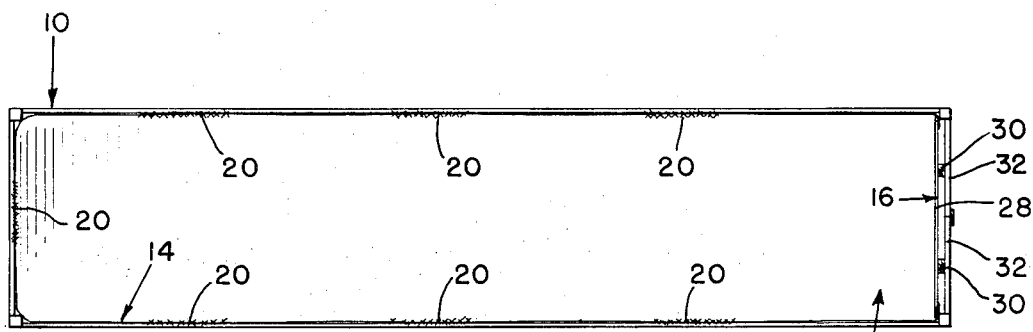
FIG. 1
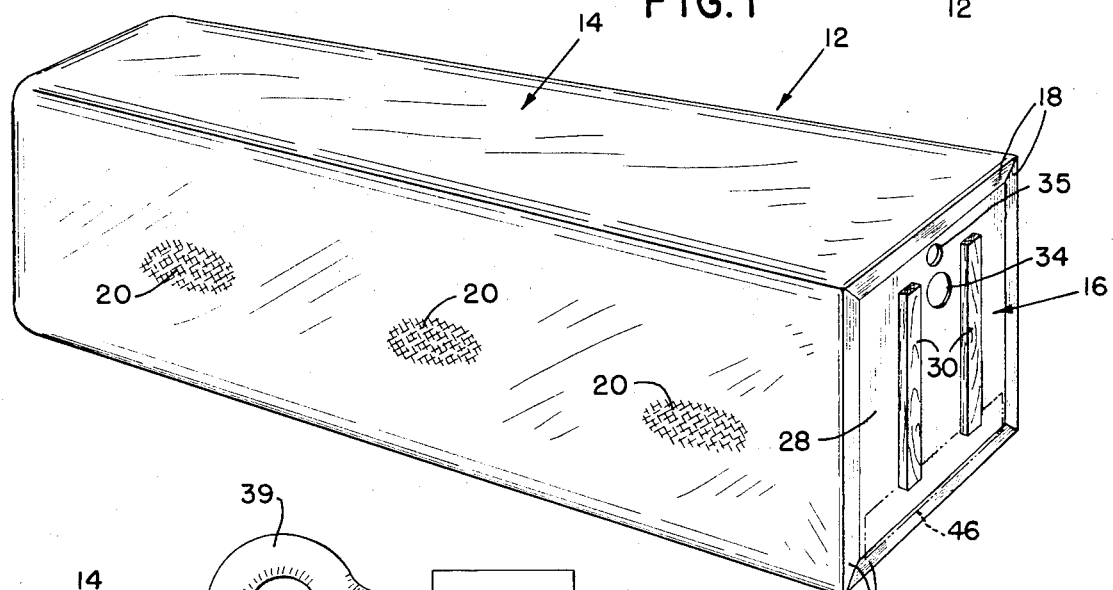
FIG. 2
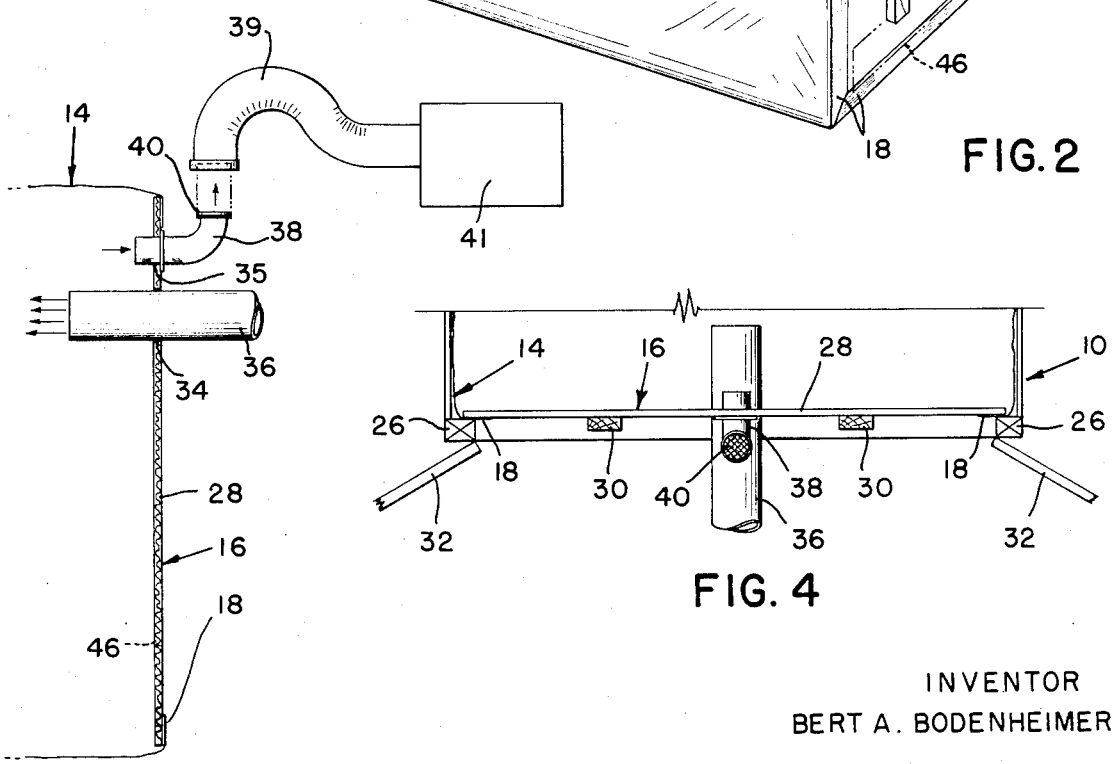
FIG. 3
FIG. 4
INVENTOR
BERT A. BODENHEIMER

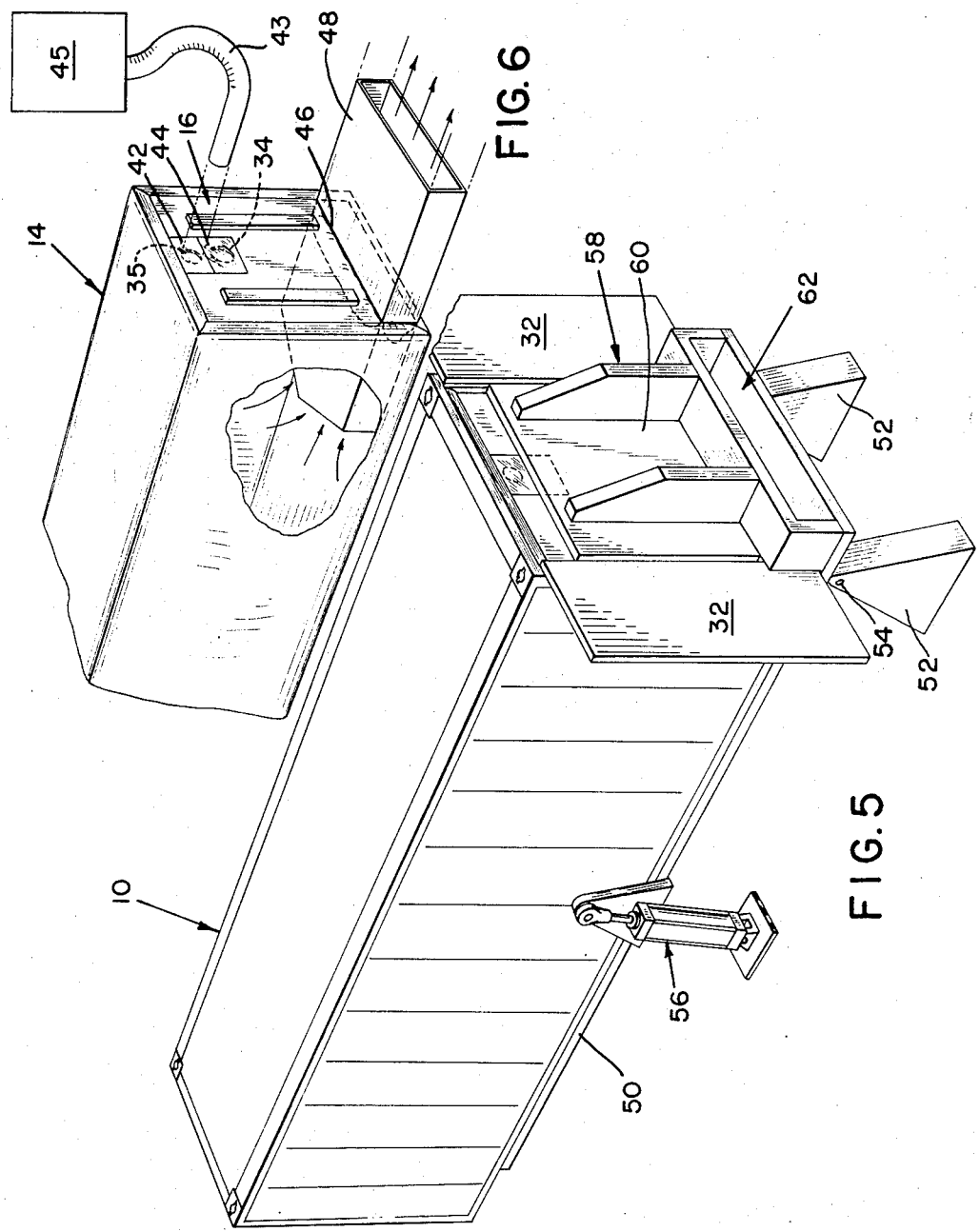

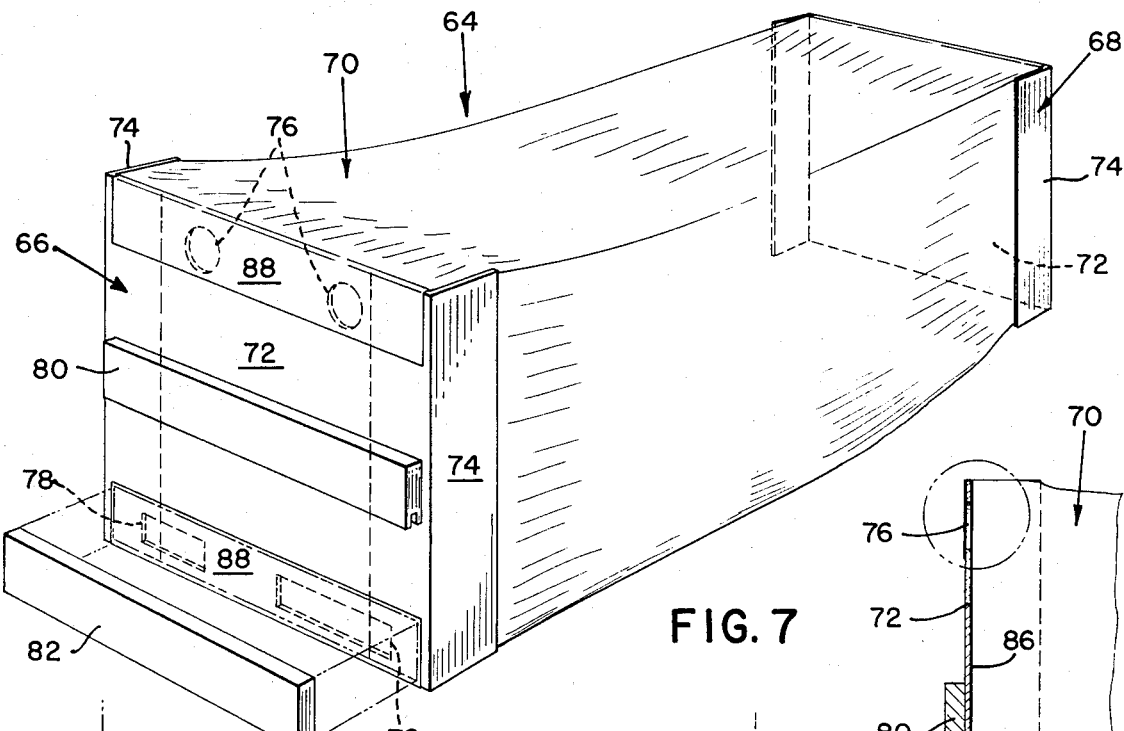
FIG. 7
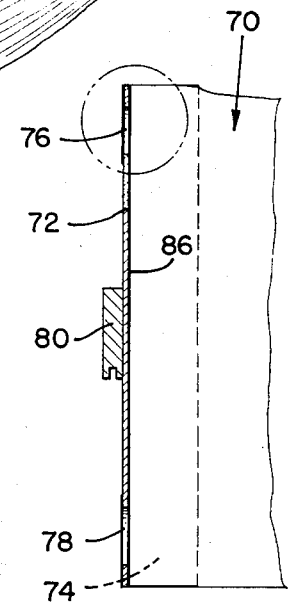
FIG. 8
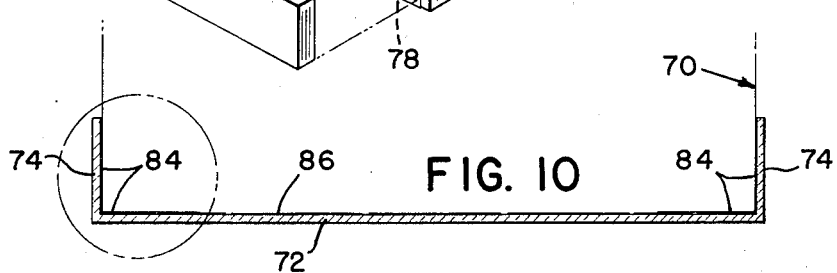
FIG. 10
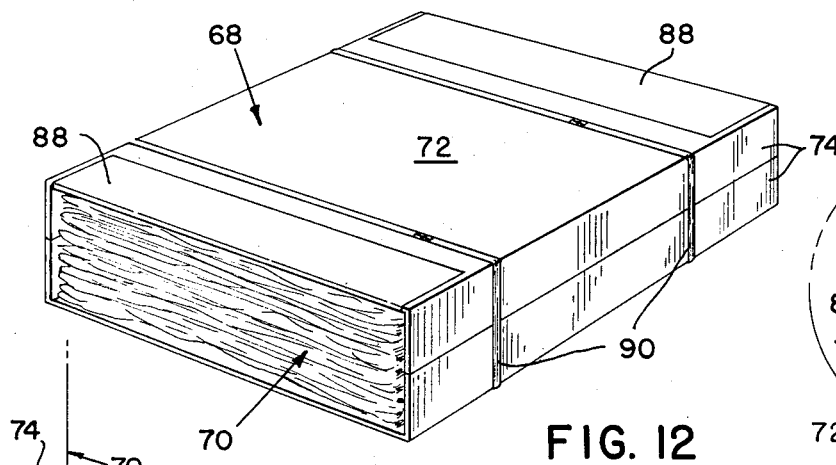
FIG. 11
FIG. 12
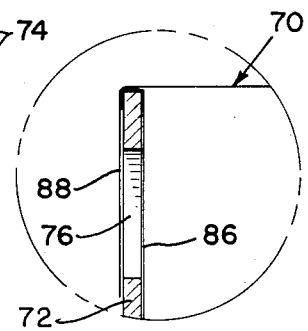
FIG. 9
INVENTOR
BERT A. BODENHEIMER

3,696,952

BULK CARGO HANDLING SYSTEM AND METHOD

This application is a continuation-in-part of application Ser. No. 21966 filed 23 Mar. 1970, now abandoned, for BULK CARGO HANDLING SYSTEM.

BACKGROUND, BRIEF SUMMARY AND OBJECTS OF THE INVENTION

This invention relates generally to the handling of bulk cargo and more particularly to a system for handling bulk cargo in conventional cargo containers or trucks.

In the past, problems have been encountered in loading and unloading flexible bulk cargo liners positioned within standard freight containers. One of the major problems encountered in loading of such container liners is that of removing air from within the liner as material is forced or being blown into the liner through a loading pipe. In addition, unloading problems have been experienced due to the liner collapsing and choking the discharge opening or due to the liner being sucked into the discharge opening when removing the cargo by vacuum. Unsuccessful attempts have been made to overcome the unloading problems by providing hooks on the bags adapted to be secured to corresponding eyes secured to the container interior walls.

In addition, problems have been encountered in transferring conventional permanent type bulkheads to and from the containers, as well as providing storage for the bulkheads when not in use. Normally the conventional bulkheads are of heavy metal or wood construction.

The bulk cargo handling system of the present invention avoids the undesirable characteristics of the bulk cargo handling systems presently available.

Briefly, the invention utilizes a throw-away type bag or tube member having open ends closed by disposable bulkheads constructed of lightweight, relatively inexpensive materials for transporting bulk cargo within conventional freight containers. The freight containers may be of the type disclosed, for example, in U. S. Pat. Nos. 3,044,653 and 3,085,707 which are adapted to be transferred between land vehicles and marine vessels which containers are capable of being stacked in superposed relation upon a large seagoing vessel.

The disposable bag may be maintained in a generally opened condition within a conventional container by adhesive provided either on the container inner walls or the exterior portions of the bag member. in the event the liner is provided with a bulkhead at each end, the bulkheads may be wedged conveniently between the container side walls for maintaining the bag in an opened condition. The bulkheads, which may be formed of heavy cardboard, are supported by the container end walls and/or by being frictionally supported between the container side walls in an upright condition. Thus, the bulkheads are permitted to float or be displaced longitudinally of the container during loading and during transport of the container due to the bulk cargo within the liner. Therefore, load applied to the bulkheads by the product is transferred directly to the container rear doors and/or front wall. The bulk material is loaded through an opening adjacent the top of the rear bulkhead. A vent opening, adapted to receive a vent pipe and filter therein, permits air to be discharged from within the bag member as it is being filled with the bulk material. An opening at the base of the rear bulkhead, which may be sealed by the bag member or other suitable materials, is adapted to be pierced by an unloading chute or other suitable means for removing material from within the bag. The frictionally positioned bulkheads and/or adhesive retains the bag in position as the material is loaded and unloaded by vacuuming suction means or by mounting the container or truck on a tilt platform. The container may be reutilized for transporting freight merely by removing the disposable bag and bulkheads and spraying a suitable adhesive solvent on adhesive areas, if any, of the inner container walls for removal of adhesive therefrom.

One of the primary objects of the invention is a system for handling freight or bulk cargo within a container without permanent modification thereto.

Another object of the invention is the provision of a liner for use in any conventional freight container which assures contamination-free handling of bulk cargo.

Still another object of the invention is the provision of a means for removing air from within the container liner as the liner is being filled.

One feature of the invention is the provision of a liner package adapted to be readily and conveniently positioned within a container in an opened condition.

Another important feature is the provision of a system for retaining the flexible liner bag in position during evacuation of the bulk material from within the container.

Another feature of the invention is the provision of a simple and inexpensive system for converting a standard freight container into a bulk cargo container.

Other features and advantages of the invention will become apparent during the course of the following detailed description taken in conjunction with the accompanying drawings.

BRIEF DESCRIPTION OF THE FIGURES

FIG. 1 is a top plan view of a conventional box-like container, with the top portion removed to illustrate a flexible cargo-receiving bag positioned therein;

FIG. 2 is a perspective view of a container liner with the flexible, cargo-receiving bag having the open end sealed by a bulkhead or closure member;

FIG. 3 is a fragmentary, side sectional view of the bag closure member illustrating the vent pipe and cargo loading pipe positioned therein;

FIG. 4 is a fragmentary, top plan view with parts removed, illustrating the bag, closure member, vent and cargo loading pipes positioned within the closure member;

FIG. 5 is a perspective view of the container with rear doors open mounted upon a tilt platform having a supporting structure for the bag closure member;

FIG. 6 is a rear perspective view of the bag member as it normally would be positioned within a container illustrating a cargo-unloading chute positioned within an opening in the bag closure member;

FIG. 7 is a perspective view of a modified embodiment of a container liner of the present invention illustrating bulkheads at each end of the bag member;

FIG. 8 is a cross sectional view of the outermost bulkhead of FIG. 7 having the bag member attached thereto;

FIG. 9 is an enlarged view of the uppermost corner of the bag member and bulkhead of FIG. 8;

FIG. 10 is a fragmentary, sectional view of the liner illustrating the manner of securing the bag member to the bulkhead;

FIG. 11 is an enlarged view of one corner of the liner of FIG. 10; and

FIG. 12 is a perspective view of the liner package including bulkheads and bag member before installation within a container.

DETAILED DESCRIPTION OF THE INVENTION

Referring to FIGS. 1–6, reference numeral 10 designates a conventional container of the type disclosed in U. S. Pat. Nos. 3,044,653 and 3,085,707 having a liner 12 positioned therein for receiving bulk cargo. The liner 12 includes a flexible, disposable bag member 14, which may be constructed of kraft paper or polyethylene, and a bulkhead 16 for closing the open end of the bag member.

The bag 14 may be of a generally box-like configuration, as shown by FIG. 2, which conforms generally to the interior dimensions of the container 10 but may equally well be made of a single tubular cross-section having a second, solid bulkhead to act as a closure for the opposite end of the tube as shown by FIGS. 7–12. The edge portions 18 adjacent the open end of the bag are folded over and secured to the bulkhead 16 adjacent the outer periphery thereof. Adhesive or other suitable means provides an airtight seal between the bulkhead 16 and the edge portions 18. In order to support and maintain the flexible bag 14 generally in the configuration of FIG. 2, contact adhesive 20 or other equivalent securing means is provided on the container interior walls at preselected locations. The adhesive areas 20 retain bag 14 in position before and during loading of cargo into the liner 12, and prevent the bag from collapsing when the cargo is evacuated from the liner 12.

The bulkhead 16 includes a generally rectangular or square closure member 28 having spaced support or block members 30, which may be vertically or horizontally disposed, secured thereto for transmitting the cargo load to the container rear doors 32 when the doors are in the closed position. The closure member 28 may be constructed of heavy duty cardboard while blocks 30 may be of wood or cardboard construction. As can be observed from FIG. 4, the width of closure member 28 is greater than the distance between the container rear corner posts 26 and generally corresponds to the distance between the container side walls for helping to retain the bulkhead 16 within the container 10.

A plurality of openings is provided within the bulkhead 16 for facilitating loading and unloading of the cargo. A cargo loading opening 34 is provided in the upper portion of the bulkhead 16 for receiving a cargo loading pipe 36. The bulk cargo is forced or blown through the pipe 36 in a conventional manner as the pipe is displaced longitudinally of the bag member 14 and container 10 to distribute the load evenly within the bag. As the liner 12 is filled through opening 34, means must be provided for permitting air to escape from within the liner. A vent opening 35 is located adjacent the loading pipe opening 34 for receiving a vent pipe 38 which permits the discharge of air used in blowing the cargo into the liner. The vent pipe 38 may be equipped with an appropriate filter 40 for preventing dust build-up in the cargo loading areas. The openings 34 and 35 are located well above the final product line within the liner 12. After loading, the openings 34 and 35 are sealed by a heavy paper or polyethylene sheet 42 and 44 having contact adhesive or equivalent means around the periphery which adheres to the bulkhead 16.

A heavy blower 41 and flexible pipe 39 may be connected to vent pipe 38 to remove as much air as possible from the liner 12 after loading to prevent condensation of moisture onto the product, since the liner will not be completely filled and temperature changes during the voyage may occur.

The bulk cargo can be evacuated from the liner 12 by conventional vacuuming techniques or by tilting the container 10. For unloading purposes, an opening 46 is located adjacent the base of bulk-head 16. The opening 46, which extends substantially the full width of the bulkhead, is initially covered by the lower edge portion 18 of the bag material and sealed to the bulkhead 16, as shown by FIGS. 2 and 3. Prior to unloading the material, sealing opening 46 is pierced to permit material to be discharged therethrough. Preferably the bag material is pierced by an unloading chute or duct 48, having exterior dimensions corresponding substantially to the interior dimensions of opening 46, as the duct is forced through the opening, as shown by FIG. 6. When tilt unloading is used, the filled container 10 is mounted upon a platform 50 which is hinged to supports 52 by suitable pins 54. Fluid cylinder arrangements 56, one positioned on each side of platform 50, are provided to tilt container 10 and platform 50 about pins 54 to facilitate removal of cargo from the container.

A support structure 58, including a plate 60, is provided at the rear of platform 50 for supporting the bulkhead 16 after the container doors 32 have been opened before the platform is tilted to the desired angle. Thus as the cargo weight shifts to the bulkhead 16, the load is transmitted to the support structure 58 without imposing any significant stress to the bulkhead 16. A support structure opening 62, corresponding in size to the opening 46, is located in alignment with bulkhead opening 46 for receiving the unloading chute 48.

In operation of the bulk cargo handling system, contact adhesive is sprayed at designated areas on the interior walls of a conventional freight container prior to installation of the disposable liner 12 therein. The liner 12 is placed within the container and the bag 14 adhesively secured to the container interior walls, as shown by FIG. 1. Alternatively, the bag 14 may be provided with adhesive areas on the exterior portions thereof for contacting the container interior walls and maintaining the bag in an opened condition for receiving bulk cargo therein. The edge portions 18 of the bag have previously been folded over and sealed to the bulkhead. Note that the lowermost edge portion 18 is sufficiently large to cover the unloading opening 46. The bag may be positioned by inflating it with air through pipe 36 before the product is admitted through pipe 36.

Pipe 38 including filter 40 is inserted within opening 35 to vent the liner 12 as it is filled with material being fed through the loading pipe 36. Upon completion of the loading of material, pipes 36 and 38 are removed and the openings 34 and 35 are sealed by heavy paper or other suitable means. The container doors are closed, with the inner walls abutting blocks 30 of bulkhead 16 to provide support for the relatively light bulkhead, and the container transported to the desired location. Upon arrival at its destination, the container 10 is mounted upon the tiltable platform 50 with the rear doors opened and with the bulkhead 16 positioned against support structure 58 to transfer the bulk cargo load thereto. The unloading chute is inserted through support structure opening 62 and into the liner 12 by piercing the bag portion 18 covering bulkhead opening 46, before the platform has been tilted to the desired degree. A blower 45 may be provided at the unloading site to blow air through flexible pipe 43 and opening 35, after removal of the paper closure 42, to inflate the bag fully and to provide makeup air as the cargo is discharged from the liner 12. As the bulk material is discharged through the chute 48, the contact adhesive prevents the bag 14 from collapsing and choking the chute.

If the material is unloaded from the liner 12 by vacuuming, rather than by tilting the container 10, the adhesive holds the bag and prevents it from being sucked into the discharge opening 46 in bulk-head 16.

After the material has been evacuated from the container, the bulkhead 16 and bag member 14 are removed therefrom. Any adhesive material remaining on the container interior walls may be sprayed with a suitable solvent to remove the adhesive.

FIGS. 7-12 illustrate a modified embodiment of the container liner 64 incorporating two bulkheads 66, 68 and a flexible bag or tube 70 attached between the bulkheads. The bulkheads 66, 68 are capable of vertically supporting themselves when properly positioned within the extreme inside front and rear of a container.

Each bulkhead includes a wall 72 formed of cardboard or other suitable materials having lip portions or members 74 extending at right angles relative thereto. The spacing between the lip members 74 generally corresponds to the spacing between the side walls of a container in which the liner is to be installed such that the bulkhead can be forced or wedged between the container side walls to maintain the bag member 70 in a generally opened condition as shown by FIG. 7.

The rearwardmost bulkhead 66 is provided with a plurality of openings in the wall 72 for facilitating loading and unloading of the liner 64. The uppermost portions of wall 72 have openings 76 therein for loading of bulk cargo into the liner. The bulk cargo may be loaded by being forced or blown through a pipe or conduit, similar to pipe 36 of FIG. 3, which may be inserted into one of the openings 76. A suitable vent arrangement may be mounted within the other opening 76 to vent the liner to the atmosphere during loading and to remove air from within the liner after loading to prevent moisture condensation therein. The lower portions of the wall 72 of bulkhead 66 are provided with openings 78 for facilitating unloading of the bulk cargo from the container by vacuuming techniques or by tilting the container.

One or more horizontally extending supports 80 having a length corresponding substantially to the width of the wall 72 may be attached thereto for transmitting the cargo load to the container rear doors. The lower edge of support 80 may be provided with a slot 84 to form a hand grip when installing or removing the bulkheads. An additional support 82, somewhat similar to support 80, may be positioned below support 80 and overlapping the openings 78.

Bulkhead 68 is constructed similar to the rear bulkhead 66 with the exception of the openings and the horizontally extending supports 80, 82.

To completely seal the cargo within the liner and prevent product contact with the cardboard bulkheads, a sheet of polyethylene or suitable material 86 conforming generally to the shape of the bulk-head may be secured to the inside of each bulkhead, as shown by FIGS. 8-11.

The bag or tube 70, preferably formed of polyethylene, is attached to the bulkheads by adhesive or other fastening means. As shown by FIGS. 7, 10 and 11, side portions 84 of the bag member may be secured to the inner edges of the lips 74 and/or the inner side of wall 72. As illustrated, the portions 84 overlap the edge portions of sheet 86. The upper and lower portions 88 of the bag 70 extend over the edges of and are secured to the bulkheads.

As shown by FIGS. 7 and 9, the portions 88 overlap sufficiently to close or seal the openings 76 and 78 of the bulkhead 66. Therefore, the openings may be sealed by the bag portions 88 and/or the sheet 86, the portions and sheet capable of being readily pierced when the liner is to be loaded or unloaded.

Alternatively, the end portions of the bag member 70 may be secured to the bulkheads by various methods. For example, the bag may be secured to the bulkheads in a manner similar to that shown by FIG. 2. This would necessitate sealing of openings 76, 78 by heavy paper or polyethylene sheet, as disclosed in FIG. 6.

FIG. 12 illustrates a liner package before installation within a container. The flexible bag 70, having open end portions secured to the bulkheads, is positioned between the bulkheads in a folded or accordian fashion. Bands 90 which extend around the bulkheads retain the liner in package form until ready for installation within a container. The liner 12 of FIGS. 1-6 may be packaged in a similar manner.

Normally, the outer edge portions of the bulkheads frictionally engage or are wedged between the container side walls rather than being rigidly secured thereto. Therefore, since the bulkheads are not secured to the container, a floating action or shifting movement of the bulkheads is permitted during loading or shifting of the cargo to transfer load imparted on the bulkheads directly to the container front wall and/or rear doors.

While the liner 12 has been described as having one bulkhead and the liner 64 as having two bulkheads, it is to be understood that either bag member 14 or 70 may have one or both ends closed by bulkheads.

I claim:

1. Apparatus for transporting bulk cargo comprising a container having wall means defining a door opening and door means secured to said wall means, liner means positioned within said container for receiving the bulk cargo, including a flexible, hollow bag having at least one open end and means for closing said open end, means for releasably positioning said liner between said container wall means for maintaining said liner in an opened condition therein during loading and unloading of said liner means, and displaceable means for supporting said container and said liner means during unloading of the bulk cargo therefrom, said closure means comprising a flexible, lightweight, bulkhead for transmitting the cargo load directly to said supporting means.

2. Apparatus for transporting bulk cargo as defined in claim 1, wherein said supporting means includes a tiltable loading platform having a structure for abutting said flexible bulkhead for receiving forces applied to said bulkhead by said bulk cargo.

3. The method of transporting bulk cargo within a container having side walls, an end wall, a bottom, and a rear opening normally closed by at least one door comprising the steps of; simultaneously placing a disposable, lightweight, cargo liner including a flexible bag member having at least one flexible bulkhead secured thereto, within a container, placing the bag member in the container in a generally opened condition while positioning the flexible bulkhead adjacent the door opening such that forces applied by the bulk cargo within the liner will be transmitted to the bulkhead which yields and engages the rear door to apply the forces directly to the container door, loading the liner with a predetermined amount of bulk cargo by forcing the bulk cargo through an opening in the flexible bulkhead, transporting the container, liner and bulk material to a designated location, and evacuating the bulk cargo from within the liner while maintaining the positioning of the bag member within the container.

4. The method of transporting bulk cargo within a container as recited in claim 3, wherein the flexible bag member has a flexible bulkhead secured to each end thereof and the bulkheads are wedged between the container side walls in an upright condition adjacent the end wall of the container and adjacent the door opening to maintain the bag member in a generally open condition.

5. The method of transporting bulk cargo within a container as recited in claim 3, wherein the bulkhead is positioned within the container in an upright condition such that the bulkhead end portions frictionally engage the container side walls and permit displacement of the bulkhead longitudinally of the container due to shifting of the bulk cargo during loading or transport of the container.

6. The method of transporting bulk cargo within a container as recited in claim 3, wherein the bulk cargo is evacuated from the liner bag member by vacuuming.

7. The method of transporting bulk cargo as recited in claim 3, wherein the bulk cargo is evacuated from the liner bag member by opening the container door, breaking a sealed opening in the bulkhead and tilting the container.

8. The method of transporting bulk cargo as recited in claim 7, and further including the step of positioning a support adjacent the bulkhead for supporting the flexible bulkhead and the load transmitted to the bulkhead during tilting of the container.

9. The method of transporting bulk cargo as defined in claim 3, wherein the liner bag member is secured to the container walls by adhesive.

10. The method of transporting bulk cargo as defined in claim 3, and further including evacuating air from within the bag member after loading of the bulk cargo.

11. The method of transporting bulk cargo as defined in claim 3, and further including the step of sealing the bulkhead opening before transporting the container.

12. The method of transporting bulk cargo within a container having side walls, an end wall, a bottom, and a rear opening normally closed by at least one door comprising the steps of; placing a disposable, lightweight, cargo liner including a flexible bag member having at least one flexible bulkhead secured thereto, within a container, placing the bag member in the container while positioning the flexible bulkhead adjacent the door opening such that the forces applied by the bulk cargo within the liner will be transmitted to the bulkhead which yields and engages the rear door to apply the forces directly to the container door, loading the liner with a predetermined amount of bulk cargo by forcing the bulk cargo through an opening in the flexible bulkhead transporting the container and contents to a location, and unloading the container at said location.

* * * * *